May 30, 1950 A. CARSON ET AL 2,509,477

COIN CONTROL DEVICE FOR TELEPHONE COIN COLLECTORS

Filed Jan. 8, 1948

INVENTORS: A. CARSON
K. M. GASSMAN
BY
H. A. Pattison
ATTORNEY

Patented May 30, 1950 2,509,477

UNITED STATES PATENT OFFICE 2,509,477

COIN CONTROL DEVICE FOR TELEPHONE COIN COLLECTORS

Arthur Carson, Richmond, and Kenneth Mackinzie Gassman, Lynchburg, Va., assignors to American Telephone and Telegraph Company, a corporation of New York Application January 8, 1948, Serial No. 1,144

4 Claims. (Cl. 179—6.3)

This invention relates to coin control devices and more particularly to coin control devices of a type sometimes used in collecting coins for telephone services.

Telephone coin collectors now in general use are constructed to require deposit into the coin collector of a coin not below the value of a five-cent piece before a telephone call can be obtained.

An object of the present invention is to provide an improved coin collecting apparatus through the operation of which a telephone call can be obtained only when a ten-cent piece or a coin of greater value than a ten-cent piece is deposited in the coin collecting apparatus.

A feature of the invention resides in a plurality of fingers constructed and arranged to be operated by coins.

Another feature resides in a latch means for one of the fingers.

Another feature resides in a switch controlled by operation of the fingers.

In the drawings:

Fig. 2 is an enlarged view of a portion of the telephone pay station apparatus shown in Fig. 1 and taken from the back of Fig. 1 and showing the present invention;

Fig. 3 is an enlarged view, partly in section, of a portion of a coin chute with a coin therein and with parts of the fingers and parts of the switch in normal positions. Fig. 3 is taken on the line 3—3 in Fig. 2;

Fig. 4 is a view corresponding to Fig. 3 but with the parts operated to different positions by the coin;

Fig. 5 is a view corresponding to Fig. 4 but taken on the line 5—5 in Fig. 2 and showing a different coin and a different runway in the coin chute and another of the fingers in position for operation by the coin;

Fig. 6 is a view corresponding to Fig. 5 but with the finger operated by the coin and the contacts open; and Fig. 7 is a schematic showing parts of the invention and arranged to control a telephone pay station apparatus.

In telephone pay station apparatus of the coin collecting type and in which a calling dial is provided, contacts in the calling dial are operated when a subscriber operates the dial in dialing a call. To obtain the desired call the subscriber must also deposit in the coin collecting telephone apparatus a coin to pay for the call. The usual minimum charge for the call is five cents and is paid by the subscriber depositing in the telephone call collecting apparatus a five-cent piece (nickel). When the nickel is deposited in the telephone coin collecting apparatus the nickel falls by gravity through a coin chute and during its passage through the coin chute the nickel strikes a signal device and then falls further through the coin chute to trip a coin trigger and then come to rest on a coin trap.

It is found desirable in some cases to raise the charge for a telephone call and to make the initial charge for the telephone call ten cents instead of five cents.

The present invention is in the nature of a coin control unit that can be mounted on a telephone coin chute of standard construction to make the telephone coin collecting apparatus operable for obtaining a telephone call only when a dime or a coin of larger denomination is deposited in the telephone coin collecting apparatus.

Figure 1:
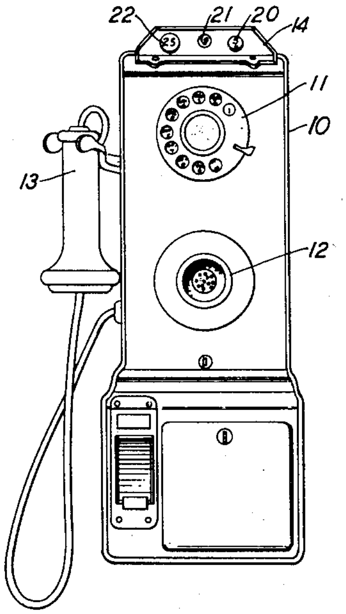
Figure 1 is a front elevational view of a type of telephone pay station apparatus in which the invention is found useful.
Figure 1:
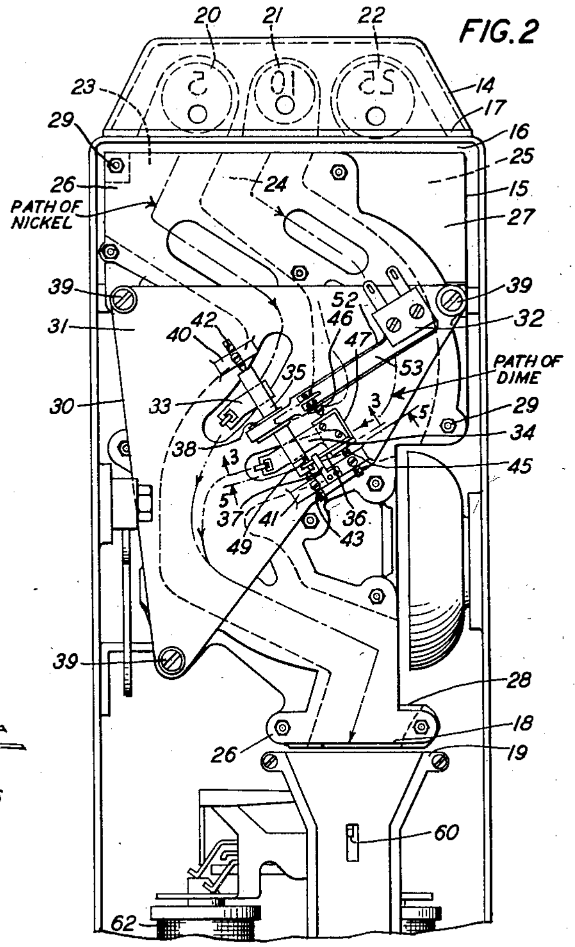
Figure 1:
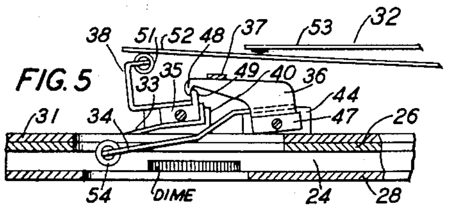
Figure 1:
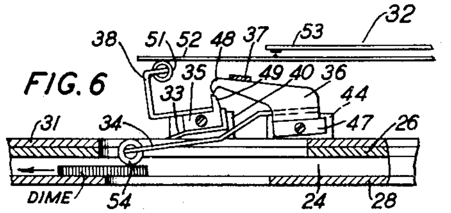
Figure 1:
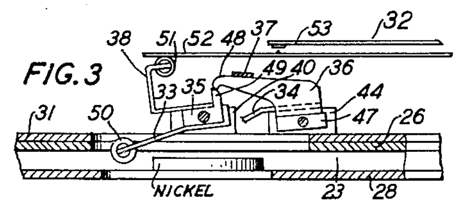
Figure 1:
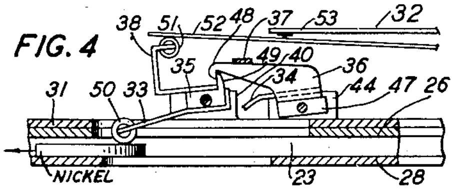
Figure 1:
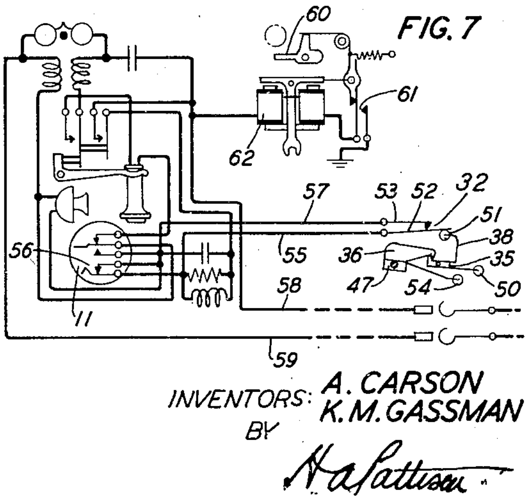

The coin control unit we have devised is applicable to telephone coin collectors of the type shown in Fig. 1 which comprises a casing 10, a dial 11, a transmitter 12, a receiver 13 and a coin gauge 14.

Within the casing 10 and as shown in Fig. 2 is a coin chute 15 of conventional form and structure, the top 16 of the coin chute 15 being supported in register with the outlet end 17 of the coin gauge 14. The lower end 18 of the coin chute 15 is in register with a hopper 19 into which a coin will fall after the coin passes through the coin chute 15.

The coin gauge 14 is designed to gauge coins known as nickels, dimes and quarters and has apertures 20, 21 and 22 into which coins of the respective denominations may be thrust in payment for a telephone call. The coin chute 15 comprises a plurality of spaced walls cooperatively defining nickel, dime and quarter runways, the nickel runway 23 being arranged to receive a nickel deposited in the aperture 20 of the coin gauge 14, the dime runway 24 being arranged to receive a dime deposited in the aperature 21 and the quarter runway 25 being arranged to receive a quarter deposited in the aperture 22 in the coin gauge 14. One of the spaced walls in the coin chute 15 and indicated as 26 in Figs. 2, 3, 4, 5 and 6 forms the back wall of the coin chute 15. The front wall 27, an intermediate wall 28 and the back wall 26 of the coin chute 15 are held in assembled condition by the bolts 29.

The back wall 26 and the intermediate wall 28 cooperatively define the nickel runway 23 and the dime runway 24. The front wall 27 and the intermediate wall 28 cooperatively define the quarter runway 25.

The coin control unit 30 of this invention is constructed for mounting on the coin chute 15 and provides a means for controlling the operation of the telephone coin collecting apparatus so that a telephone call may be obtained only when a payment of ten cents or more is made by the calling party.

The coin control unit 30 comprises an apertured plate 31, a switch 32, a nickel operable finger 33, a dime operable finger 34, a rotatable shaft 35, a pivoted latch finger 36, a spring 37 and a switch operating arm 38.

The apertured plate 31 is mounted on the back of the coin chute 15 and is secured in required position by screws 39 which extend through the apertured plate 31 and into the back wall 26 of the coin chute 15. Spaced blocks 40 and 41 of insulating material are mounted on the rear surface of the apertured plate 31 to support screws 42 and 43, respectively, which extend into recesses formed in the end portion of the rotatable shaft 35. The screws 42 and 43 form, in effect, end bearings for the rotatable shaft 35. A block 44 of insulating material is also mounted on the rear surface of the apertured plate 31 in spaced relation with the block 41. Screws 45 and 46 are supported in the respective blocks 41 and 44 and extend into recesses formed in the body portion 47 of the pivoted latch finger 36, the screws 45 and 46 forming, in effect, end bearings for the pivoted latch finger 36, a hook shaped end portion 48 of which extends over the position of the rotatable shaft 35 to engage a lug 49 on the rotatable shaft 35 when the rotatable shaft 35 is rotated to a certain position.

The coin operable finger 33 and the switch operating arm 38 are secured to the rotatable shaft 35 and extend angularly therefrom. The finger 33 extends through apertures in the plate 31 and the back wall 26 and into the nickel runway 23 and is equipped on its free end with a roller 50 extending into the path of movement of a coin going through the nickel runway 23. The switch operating arm 38 carries on its free end a roller 51 extending into engagement with the under surface of a leaf spring contact 52 of the switch 32. The leaf spring contact 52 is normally spaced from an upper leaf spring contact 53 of the switch 32 but is movable into engagement with the upper leaf spring contact 53 when the switch operating arm 38 is moved in one direction by operation of the rotatable shaft 35.

The latch finger 36 and the coin operable finger 34 are in mechanical connection, one end of the finger 34 being secured to the body portion 47 of the latch finger 36. The finger 34 extends through apertures in the plate 31 and the back wall 26 and into the dime runway 24 and carries on its free end a roller 54 extending into the path of movement of a coin going through the dime runway 24.

When a nickel comes down through the nickel runway 23 the nickel strikes the roller 50 and moves the roller 50 and the finger 33 outwardly with respect to the nickel runway 23. Outward movement of the finger 33 causes the rotatable shaft 35 to rotate in a clockwise direction to bring the lug 49 past the hook shaped end portion 48 of the latch finger 36 and to the position shown in Fig. 4. The lug 49 normally bears against the outer surface of the hook shaped end portion 48 of the latch finger 36. When the rotatable shaft 35 is rotated in a clockwise direction from the position shown in Fig. 3 the lug 49 cams the latch finger 36 against the action of the spring 37 until the lug 49 passes the hook shaped end 48 of the latch finger 36. When the lug 49 reaches the position shown in Fig. 4 the spring 37 presses the latch finger 36 into hooked engagement with the lug 49 to hold the rotatable shaft 35 latched against counter clockwise movement from the position shown in Fig. 4. The lug 49 forms, in effect, a keeper in the latch structure. The switch arm 38 is arranged to close contact spring 52 against contact spring 53 when the lug 49 moves into latched engagement with the latch finger 36. The contact springs 52 and 53 of the switch 32 are therefore held closed as long as the latch finger 36 is in hooked engagement with the lug 49 on the rotatable shaft 35.

The finger 34 as above mentioned extends into the dime runway 24 and the roller 54 on the free end of the finger 34 is arranged to be engaged by a dime coming down through the dime runway 24, the normal position of the roller 54 being indicated in Fig. 5. When a dime comes down through the dime runway 24 and strikes the roller 54 the finger 34 is moved outwardly as shown in Fig. 6 to release the latch finger 36 from engagement with the lug 49 on the rotatable shaft 35. Release of the latch finger 36 from hooked engagement with the lug 49 on the rotatable shaft 35 permits the rotatable shaft 35 to be rotated counterclockwise under the pressure of the contact spring 52 bearing on the roller 51 of the switch control arm 38. It will be seen, therefore, that passing of a nickel through the nickel runway 23 will cause the contacts in the switch 32 to close and that passing of a dime through the dime runway 24 will cause the latch finger 36 to move to a release position to allow the contacts in the switch 32 to open.

As shown in Fig. 7 the contact spring 52 of the switch 32 is in electrical connection through a conductor 55 with one of a pair 56 of normally closed pulsing contacts in the calling dial 11. The contact spring 53 of the switch 32 is in electrical connection through a conductor 57 with the other contact in the pair 56. When the switch 32 is closed it forms a short circuit around the pair 56 of pulsing contacts of the calling dial 11.

It will be understood that when a person is operating the calling dial 11 a rotatable member, not shown, but included in the calling dial 11 is operated to successively make the pulsing contacts in the pair 56 successively open and close a number of times as required to make automatic switching apparatus at a central office set up the required telephone call connection, signals being sent from the calling dial 11 over conductors 58 and 59 to a central station, not shown, but remote from the calling dial 11.

Our invention provides a coin operated means to establish a shunt around the contacts in the pair 56 in the calling dial 11 when a person tries to obtain a telephone call by depositing only a nickel in the telephone coin collector apparatus. While the shunt exists around the contacts in the pair 56 operation of the calling dial 11 is ineffective to obtain a required telephone call connection. The person trying to obtain a telephone call connection can cause opening of the shunt around the contacts in the pair 56 by depositing a dime in the telephone coin collector. Deposit of a dime in the telephone coin collector while the contacts in the switch 32 are open will not cause the switch 32 to close.

The fingers 33 and 34 do not prevent a coin or coins from passing through the coin chute 15. A coin may therefore pass entirely through the coin chute 15 to operate the trigger 60 which upon receiving the impact of a coin operates in the usual manner as shown and described in the O. F. Forsberg United States Patent No. 1,043,219, to control contacts 61 of the coin relay 62 which can be operated from a central station as required to collect or refund a coin resting on a coin trap.

What is claimed is:

1. A coin control device comprising a coin chute, a first coin runway in said coin chute, a second coin runway in said coin chute, a pivotally supported finger extending into the first coin runway and operable by a coin to move outwardly of said first coin runway, a pivotally supported finger extending into said second coin runway and operable by a coin to move outwardly of said second coin runway, a latch finger operable by one of said pivotally supported fingers and a latch keeper operable by another of said pivotally supported fingers and in camming engagement with said latch finger, said latch finger and said latch keeper being cooperable to releasably hold said pivotally supported fingers in latched condition and with the first-mentioned pivotally supported finger held outwardly of the first coin runway.

2. A coin control device comprising a coin chute, a first coin runway in said coin chute, a second coin runway in said coin chute, a rotatable shaft, a pivotally supported finger secured to said rotatable shaft and extending into the first coin runway and operable by a coin to move outwardly of the first coin runway, a pivotally supported finger extending into said second coin runway and operable by a coin to move outwardly of the second coin runway, a latch lug on said rotatable shaft and a hook-shaped latch finger in mechanical connection with the pivotally supported finger for said second coin runway and arranged for latching engagement with said latch lug when the pivotally supported finger in the first coin runway is moved outwardly of the first coin runway, said latch finger and said latch lug being in mutual engagement and being cooperable to hook together and releasably hold one of said pivotally supported fingers out of said first coin runway when a coin comes through the first coin runway and moves the pivotally supported finger out of said first coin runway.

3. In a telephone coin collector apparatus comprising a telephone calling dial device, a pair of contacts in said calling dial device to be opened and closed in dialing a call and a coin chute having a first and a second coin runway through which coins may pass, a pivotally supported coin engageable finger extending into the first coin runway and operable to move inwardly and outwardly of the first coin runway, a pivotally supported coin engageable finger extending into the second coin runway and operable to move inwardly and outwardly of the second coin runway, a pair of normally open switch contacts in conducting connection with the pair of contacts in said calling dial device, said pair of normally open switch contacts being operable to close to form a shunt around the pair of contacts in said calling dial device when the pivotally supported finger in the first coin runway is operated outwardly of the first coin runway by a coin, an arm in mechanical connection with the pivotally supported finger in the first coin runway and controlling said pair of normally open switch contacts and operable to close said pair of normally open switch contacts when the pivotally supported finger in the first coin runway is moved outwardly of the first coin runway by means of a coin and latch means on said pivotally supported fingers cooperable to hold the coin engageable finger for the first coin runway out of the first coin runway to releasably hold said arm in contact closing position to keep said pair of normally open switch contacts closed until the pivotally supported finger in the second coin runway is operated outwardly of the second coin runway by a coin.

4. In a telephone coin collector apparatus, comprising a telephone calling dial device, a pair of contact springs in said calling dial device to be opened and closed in dialing a call and a coin chute having a five cent coin runway and a ten cent coin runway through which coins may pass, a coin movable finger extending into the five cent coin runway and operable inwardly and outwardly of the five-cent coin runway, a rotatable shaft supporting said finger, a lug on said rotatable shaft, an arm supported on said rotatable shaft, a pair of normally open switch contacts closeable by means of said arm and in electrical connection with the pair of contact springs in said calling dial device, one of said pair of switch contacts being in spring-pressed engagement with said arm, said switch contacts, when closed, forming a shunt around said pair of contact springs in said calling dial device, a pivotally supported coin movable finger extending into the ten cent coin runway and operable inwardly and outwardly of the ten-cent coin runway and a hook-shaped latch finger in mechanical connection with said pivotally supported coin movable finger and having a free end portion engageable with said lug, said coin movable finger in the five cent runway being operable under impact of a coin to rotate said shaft to move said arm to close said switch contacts and to move said lug under and into latched engagement with said hook-shaped latch finger and said pivotally supported coin movable finger in the ten cent coin runway being operable under impact of a coin to move said hooked-shaped latch finger out of holding engagement with said lug.

ARTHUR CARSON.
KENNETH MACKINZIE GASSMAN.

REFERENCES CITED

The following references are of record in the file of this patent:

UNITED STATES PATENTS

| Number | Name | Date |
|---|---|---|
| 1,249,373 | Erickson | Aug. 10, 1920 |
| 2,251,073 | Shann | July 29, 1941 |